(12) United States Patent
Kang et al.

(10) Patent No.: US 11,293,543 B2
(45) Date of Patent: Apr. 5, 2022

(54) VEHICLE TRANSMISSION

(71) Applicant: SL Corporation, Daegu (KR)

(72) Inventors: Seok Kang, Gyengsangbuk-do (KR); Jungki Kim, Gyengsangbuk-do (KR)

(73) Assignee: SL Corporation, Daegu (KR)

( * ) Notice: Subject to any disclaimer, the term of this patent is extended or adjusted under 35 U.S.C. 154(b) by 337 days.

(21) Appl. No.: 16/751,878

(22) Filed: Jan. 24, 2020

(65) Prior Publication Data
US 2020/0400227 A1 Dec. 24, 2020

(30) Foreign Application Priority Data
Jun. 24, 2019 (KR) .................. 10-2019-0075214

(51) Int. Cl.
*F16H 59/10* (2006.01)
*F16H 61/18* (2006.01)
*F16H 61/24* (2006.01)
*F16H 59/02* (2006.01)

(52) U.S. Cl.
CPC ............ *F16H 59/10* (2013.01); *F16H 61/18* (2013.01); *F16H 61/24* (2013.01); *F16H 2059/0221* (2013.01); *F16H 2061/185* (2013.01); *F16H 2061/247* (2013.01)

(58) Field of Classification Search
CPC .......... F16H 59/10; F16H 61/18; F16H 61/24; F16H 2059/0221; F16H 2061/185; F16H 2061/247; F16H 59/0208; F16H 59/0278; F16H 2061/243; F16H 63/38; G05G 5/03
See application file for complete search history.

(56) References Cited

U.S. PATENT DOCUMENTS

| 6,339,968 B1 * | 1/2002 | Nagashima | ............ F16H 59/10 192/220.3 |
| 2008/0042644 A1 * | 2/2008 | Heo | ...................... F16H 59/105 324/207.2 |

* cited by examiner

*Primary Examiner* — Victor L MacArthur
(74) *Attorney, Agent, or Firm* — United One Law Group LLC; Kongsik Kim; Jhongwoo Peck

(57) ABSTRACT

A vehicle transmission includes a shift lever including a receiving unit formed therein, a bullet in which at least a portion thereof is inserted and disposed within the receiving unit of the shift lever, and a detent groove unit which allows the bullet to advance or retreat depending on a profile of a contact surface in contact with the bullet as the shift lever rotates. The bullet includes a guide aperture formed longitudinally along an advancement-retreat direction of the bullet, and a fixing pin having at least one end thereof fixed to the receiving unit is inserted into the guide aperture.

12 Claims, 9 Drawing Sheets

VEHICLE TRANSMISSION

CROSS-REFERENCE TO RELATED APPLICATION

This application claims the benefit of priority from Korean Patent Application No. 10-2019-0075214 filed on Jun. 24, 2019, which application is herein incorporated by reference in its entirety.

BACKGROUND

1. Technical Field

The present disclosure relates to a vehicle transmission, and more particularly, to a vehicle transmission capable of providing a feeling of operation to a driver when the driver operates a shift lever.

2. Description of the Related Art

A transmission of a vehicle adjusts a gear ratio in order to keep the rotational speed of an engine constant based on the speed of the vehicle. A driver may operate a shift lever in the transmission to adjust the gear ratio of the transmission.

A shift mode of a vehicle transmission includes a manual shift mode in which the driver adjusts the gear ratio and an automatic shift mode in which the gear ratio is automatically adjusted based on the speed when the driver selects a driving mode D. In addition, a sport mode type transmission capable of performing manual shifting and automatic shifting in a single transmission is used. The sport mode type transmission can, in principle, perform automatic shift, while the driver may perform manual shift by increasing or decreasing the gear stage.

The transmission of the vehicle is provided with a bullet disposed to abut a detent groove unit in the shifting lever to aid proper shifting operation of the driver and to provide accurate operation of the shifting lever. The bullet is elastically supported by a spring or the like to move while keeping in contact with the detent groove unit, thereby allowing the shift lever to be moved to an appropriate position defined by the detent groove, and providing a feeling of operation when the driver operates the shift lever.

The bullet is disposed to allow one end to be inserted into a receiving groove formed in the shift lever, and the other end to be disposed to contact the detent groove unit to provide the feeling of operation when the shift lever is operated. Since the bullet is detachable from the shift lever, the bullet is separated from the shift lever during assembling and detaching the shift lever, thereby negatively impacting the ease of assembly and providing a possibility of losing it. Moreover, since the bullet not only advances or retreats along the receiving groove, but also rotates with respect to an advancement or retreat direction as an axis, there is a possibility that unnecessary noise or abrasion occurs.

Therefore, there is a demand for a method that prevents the occurrence of unnecessary noise or abrasion by preventing the bullet from being rotated in the advancement or retreat direction while improving the ability of assembly of the shift lever by preventing the bullet from being separated from the shift lever.

SUMMARY

Aspects of the present disclosure provide a vehicle transmission capable of limiting a range of movement of a bullet in an advancement or retreat direction when a shift lever is rotated. Aspects of the present disclosure also provide a vehicle transmission capable of preventing a bullet from being rotated about an axis aligned with the advancement or retreat direction. However, aspects of the present disclosure are not limited to those set forth herein. The above and other aspects of the present disclosure will become more apparent to one of ordinary skill in the art to which the present disclosure pertains by referencing the detailed description given below.

According to an aspect of the present disclosure, a vehicle transmission may include a shift lever including a receiving unit formed therein, a bullet in which at least a portion thereof is inserted and disposed within the receiving unit of the shift lever, and a detent groove unit which allows the bullet to advance or retreat depending on a profile of a contact surface that is in contact with the bullet as the shift lever rotates. The bullet may include a guide aperture formed longitudinally along an advancement-retreat direction of the bullet, and a fixing pin having at least one end thereof fixed to the receiving unit may be inserted into the guide aperture.

The bullet may advance and retreat to allow the fixing pin to approach either one of a first end or a second end of the guide aperture depending on the profile of the contact surface. The fixing pin may limit a movement range of the bullet to prevent the bullet from moving out of the movement range that corresponds to a length of the guide aperture. The receiving unit may include a fixing groove into which at least one of both ends of the fixing pin is inserted, and the fixing groove may be formed to communicate with a receiving groove formed in the receiving unit into which the at least a portion of the bullet is inserted.

A shield may be disposed on an outer surface of the receiving unit to shield the fixing groove. The shield may have a ring shape that encompasses a circumference of the outer surface of the receiving unit. The receiving unit may include a mounting groove on the outer surface thereof for mounting the shield.

The bullet may be spaced apart from an inner surface of the receiving groove by a predetermined interval.

A protruding rib may be formed on an outer surface of the bullet, and a rib groove may be formed on an inner surface of the receiving groove to allow the protruding rib to be inserted into and move in the advancement-retreat direction. The protruding rib may be spaced apart from an inner surface of the rib groove by a predetermined interval. The protruding rib may prevent the bullet from rotating about an axis that is aligned with the advancement-retreat direction. The rib groove may be formed to allow one end thereof to communicate with an opening of the receiving groove.

A vehicle transmission according to the present disclosure has one or more of the following benefits. The vehicle transmission according to the present disclosure may prevent a bullet from detaching from a shift lever while limiting a range of movement of the bullet in the advancement-retreat direction, thereby improving the ability of assembly and improving the operation reliability of the bullet. In addition, the vehicle transmission according to the present disclosure may prevent the bullet from rotating about an axis aligned with the advancement-retreat direction, and thereby may reduce or prevent unnecessary noise or abrasion.

The benefits of the present disclosure are not limited to the above-mentioned benefits, and other benefits not mentioned may be clearly understood by a person skilled in the art from the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
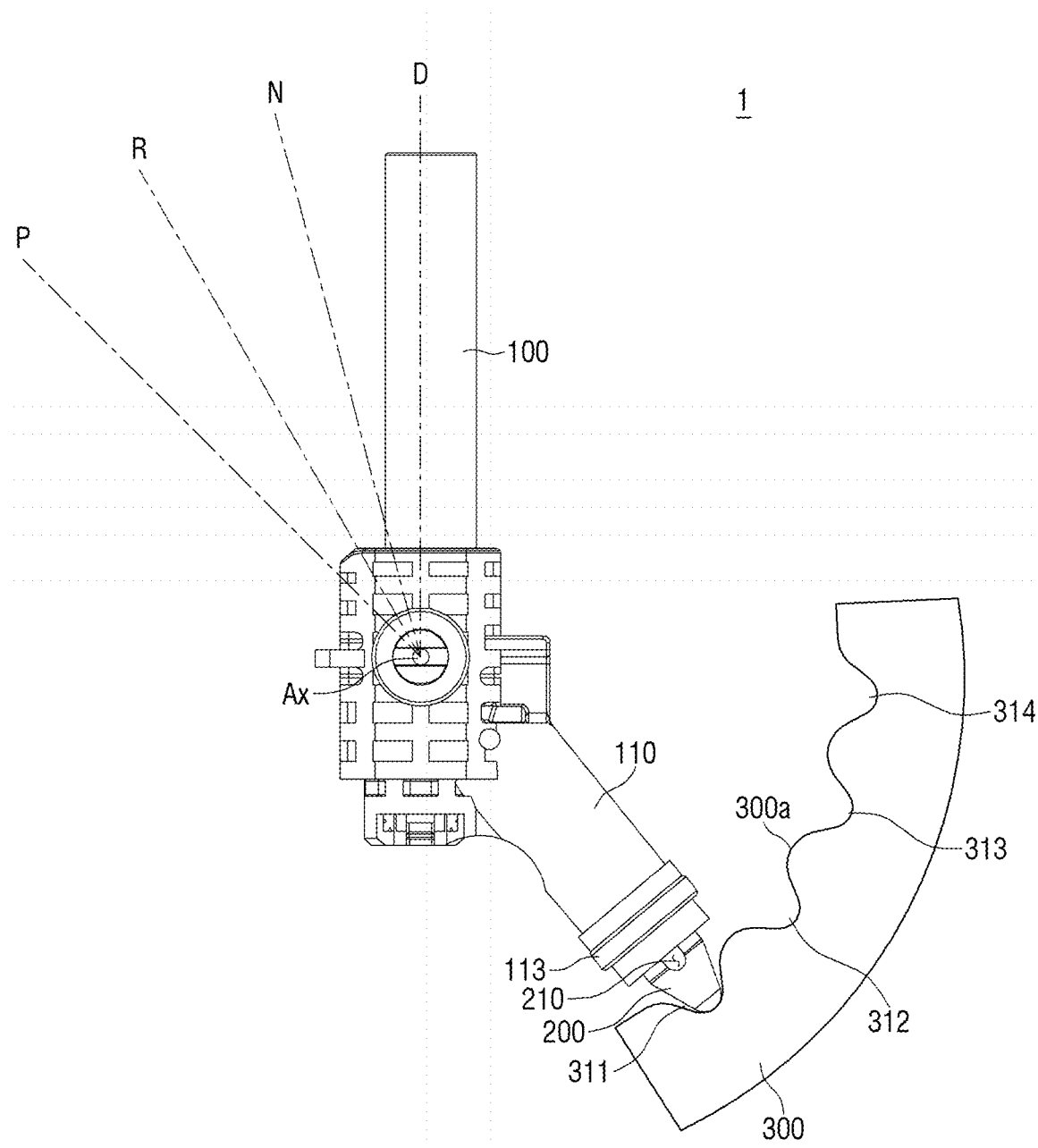
FIG. 1 is a side view showing a vehicle transmission according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present disclosure are described herein with reference to plan and cross-sectional illustrations that are schematic illustrations of exemplary embodiments of the present disclosure. As such, variations from the shapes of the illustrations as a result, for example, of manufacturing techniques and/or tolerances, are to be expected. Thus, exemplary embodiments of the present disclosure should not be construed as limited to the particular shapes of regions illustrated herein but should be construed to include deviations in shapes that result, for example, from manufacturing. In the drawings, respective components may be enlarged or reduced in size for convenience of explanation.

Hereinafter, the present disclosure will be described with reference to the drawings for explaining a vehicle transmission according to exemplary embodiments of the present disclosure.

Figure 2:
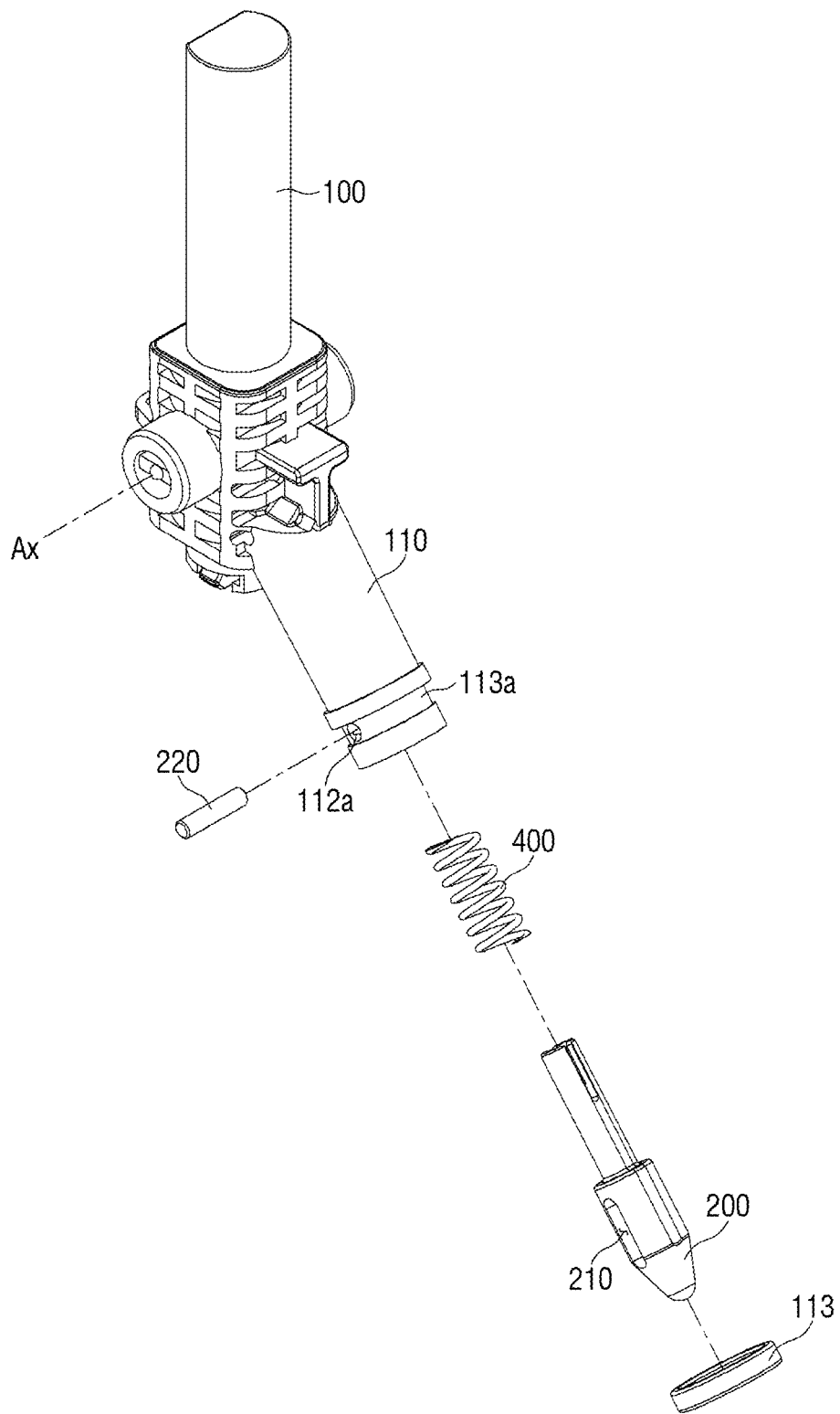
FIGS. 2 and 3 are exploded perspective views showing a shift lever according to an exemplary embodiment of the present disclosure.
Figure 3:
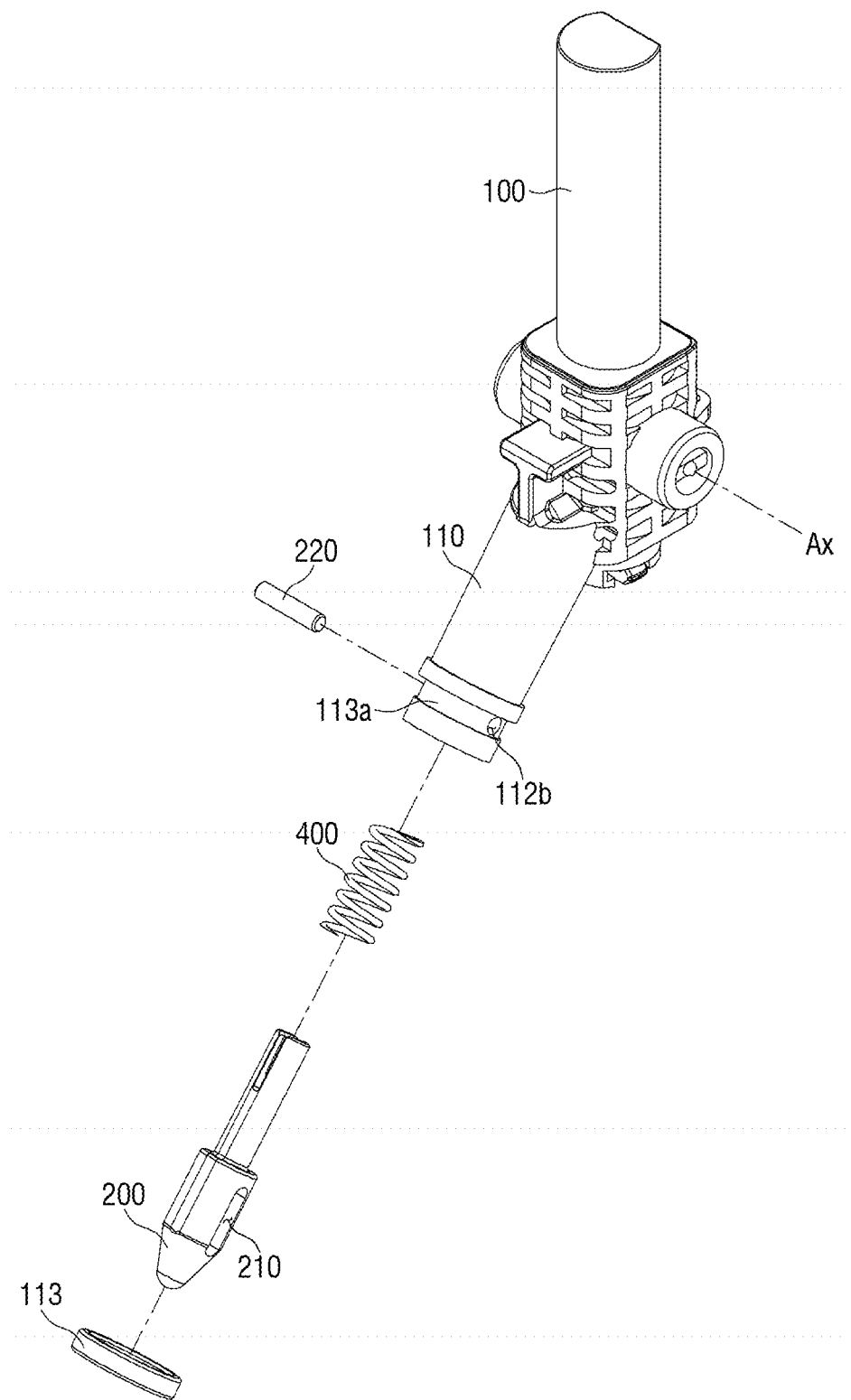

FIG. 1 is a side view showing a vehicle transmission according to an exemplary embodiment of the present disclosure, and FIGS. 2 and 3 are exploded perspective views showing a shift lever according to an exemplary embodiment of the present disclosure. Referring to FIGS. 1 to 3, a vehicle transmission 1 according to an exemplary embodiment of the present disclosure may include a shift lever 100, a bullet 200, and a detent groove unit 300. The shift lever 100 may be coupled to a knob (not shown) that serves as a handle at an end thereof. A driver may grab the knob and move it to front and rear or left and right to select a desired shift stage.

In the vehicle transmission according to the exemplary embodiment of the present disclosure, P (parking), R (reverse), N (neutral), and D (driving) stages may be selected by the shift lever 100. However, it is merely an example to help understanding of the present disclosure, and the present disclosure is not limited thereto. The shift stage selectable by the shift lever 100 may be variously changed, and one or more of the aforementioned shift stages may be selected by a button or a switch provided separately. In addition, the knob may be provided with a display device for displaying a selectable shift stage or a currently selected shift stage. However, the present disclosure is not limited thereto, and the knob may be equipped with various devices such as a button or a switch for a shift function or a shift lock function.

In the exemplary embodiment of the present disclosure, a joystick type will be described as an example. In other words, when the driver grabs the knob and moves it in the front and rear or in the left and right directions, the shift lever 100 may be rotated about an axis Ax perpendicular to a longitudinal direction of the shift lever 100 to select the shift stage. However, the present disclosure is not limited thereto, and it may be similarly applied to a rotary type where the shift lever 100 is rotated about an axis parallel to the longitudinal direction of the shift lever 100.

A sensing unit (not shown) for detecting a position of the shift lever 100 may be provided to select the shift stage depending on a position of the shift lever 100. An ECU of the vehicle may transmit a shift signal based on a sensing signal of the sensing unit to the transmission to allow the shift stage to be selected.

In the exemplary embodiment of the present disclosure, the sensing unit may be provided in the shift lever 100 to detect the position of the shift lever 100 through a change in a magnetic force of a magnet whose position changes as the shift lever 100 rotates. However, the present disclosure is not limited thereto, and the sensing unit may detect the position of the shift lever 100 in a contact or non-contact manner via a mechanical, electrical, magnetic, or optical sensor.

The bullet 200 may be disposed to allow at least a portion of the bullet 200 to be inserted into a receiving unit 110 formed integrally on one side of the shift lever 100 to generate a feeling of operation (e.g., a tactile feedback of operation, a haptic feedback of operation) when the shift lever 100 is rotated. The receiving unit 110 may include a receiving groove 111 into which the bullet 200 is inserted. The receiving groove 111 may be formed to extend along the advancement-retreat direction of the bullet 200 from an opening in which the bullet 200 is inserted. In the exemplary embodiment of the present disclosure, the shift lever 100 and the receiving unit 110 may be manufactured integrally with each other. However, the present disclosure is not limited thereto, and the shift lever 100 and the receiving unit 110 may be formed as separate objects and combined with each other.

The bullet 200 may allow the feeling of operation to be generated while advancing or retreating in the receiving groove 111 based on a profile shape of a contact surface 300a of the detent groove unit 300 disposed adjacent to the receiving unit 110. The bullet 200 may be disposed to be spaced apart from an inner surface of the receiving groove 111 by a predetermined interval. This configuration may prevent noise or abrasion due to friction between the bullet 200 and the receiving groove 111 when the bullet 200 is advanced or retreated.

In the exemplary embodiment of the present disclosure, the advancement of the bullet 200 may refer to a movement by which a portion of the bullet 200 exposed to the exterior of the receiving unit 110 increases, and the retreat of the bullet 200 may refer to a movement by which the portion exposed to the exterior of the receiving unit 110 decreases. Further, the advancement-retreat direction of the bullet 200 may be a direction with respect to the receiving unit 110, and when the shift lever 100 is rotated, the absolute orientation of the advancement-retreat direction may vary.

The detent groove unit 300 may include a plurality of detent grooves 311, 312, 313, and 314 arranged along a rotation path of the bullet 200 as the shift lever 100 is rotated about the axis Ax. Each of the plurality of detent grooves 311, 312, 313, and 314 may be formed at a position corresponding to the shift stage selectable by the shift lever 100. In the exemplary embodiment of the present disclosure, since the shift stage selectable by the shift lever 100 is P, R, N, and D stages, the detent groove unit 300 may include the plurality of detent grooves 311, 312, 313, and 314. However, the present disclosure is not limited thereto, and the number or an arrangement order of the detent grooves may be variously changed depending on the shift stage selectable by the rotation of the shift lever 100.

Since the bullet 200 is elastically supported by an elastic member 400 disposed within a receiving groove 110 and moved from one of the plurality of detent grooves 311, 312, 313, and 314 to an adjacent one, the bullet 200 may be maintained in contact with the contact surface 300a of the detent groove unit 300. In other words, when the shift lever 100 is rotated about the axis Ax, the bullet 200 may move from one of the plurality of detent grooves 311, 312, 313, and 314 to an adjacent one of the plurality of detent grooves 311, 312, 313, and 314. In this process, the bullet 200 may be retreated in a direction in which the elastic member 400 is compressed. Subsequently, the bullet 200 may be advanced by a restoring force of the elastic member 400. As a result, the feeling of operation may be generated when the driver operates the shift lever 100.

The bullet 200 may include a guide aperture 210 formed longitudinally in the advancement-retreat direction. The guide aperture 210 may prevent the bullet 200 from being separated from the shift lever 100 to allow easier assembly and disassembly. In addition, the guide aperture 210 may limit a movement range of the bullet 200 to prevent the bullet 200 from moving out of the movement range that corresponds to a length of the guide aperture 210 when the bullet 200 is advanced or retreated. Further, it may block the bullet 200 from rotating about an axis that aligns with the advancement-retreat direction. In other words, the bullet 200 may be prevented from a rolling motion about a longitudinal axis that passes through the center of the bullet 200 and extends in the advancement and retreat direction.

When the movement range in the advancement or retreat direction of the bullet 200 is limited, the bullet 200 may be prevented from excessively advancing or retreating so that the feeling of operation is improperly generated, thereby improving the operational reliability of the bullet 200. In addition, since the bullet 200 is prevented from rotating about an axis along the advancement-retreat direction thereof, noise or abrasion due to the friction between the contact surface 300a of the detent groove unit 300 and the bullet 200 may be reduced or prevented.

A fixing pin 220 may be disposed through the guide aperture 210, and a first end and a second end of the fixing pin 220 may be disposed at each side of the bullet 200. Due to the fixing pin 220 disposed through the guide aperture 210, the bullet 200 may have a limited range of movement in the advancement or retreat direction and prevent the bullet 200 from moving out of the movement range that corresponds to the length of the guide aperture 210. Due to the fixing pin 220, the bullet 200 may also be prevented from rotating about an axis along the advancement-retreat direction. The fixing pin 220 may be inserted into and fixed to fixing grooves 112a and 112b that are formed to communicate with the receiving groove 111 at each side of the receiving unit 110 facing each other, respectively.

In the exemplary embodiment of the present disclosure, the both ends of the fixing pin 220 may be inserted into and fixed to the fixing grooves 112a and 112b, respectively. However, the present disclosure is not limited thereto, and at least one end of the fixing pin 220 may be fixed by the receiving unit 110.

Further, a shield 113 that shields (e.g., covers) the fixing grooves 112a and 112b from being exposed to the exterior may be disposed on an outer surface of the receiving unit 110. A mounting groove 113a having a shape substantially corresponding to a shape of the shield 113 may be formed on the outer surface of the receiving unit 110. The shield 113 may prevent at least one of the first end or the second end of the fixing pin 220 from moving to the exterior of the receiving unit 110 through at least one of the fixing grooves 112a and 112b of the receiving unit 110 and prevent the fixing pin 220 from being separated from the guide aperture 210. In the exemplary embodiment of the present disclosure, the shield 113 may be formed in a ring-shape. However, the present disclosure is not limited thereto, and the shield 113 may be formed in various shapes such that the fixing grooves 112a and 112b formed in the receiving unit 110 are unexposed to the exterior. In addition, the shield 113 may be separated into two or more components.

As set forth above, according to the vehicle transmission 1 of the present disclosure, since the bullet 200 and the elastic member 400 are inserted into the receiving groove 111 before assembling the shift lever 110 to allow the bullet 200 to be elastically supported by the elastic member 400, and the fixing pin 220 is fixed to the receiving unit 110 to penetrate through the guide aperture 210 of the bullet 200, the bullet 200 may be prevented from being separated from the shift lever 100. As a result, easier assembly and disassembly may be possible, and the movement range of the bullet 200 in the advancement or retreat direction may be determined by the guide aperture 210 and the fixing pin 220.

Figure 4:
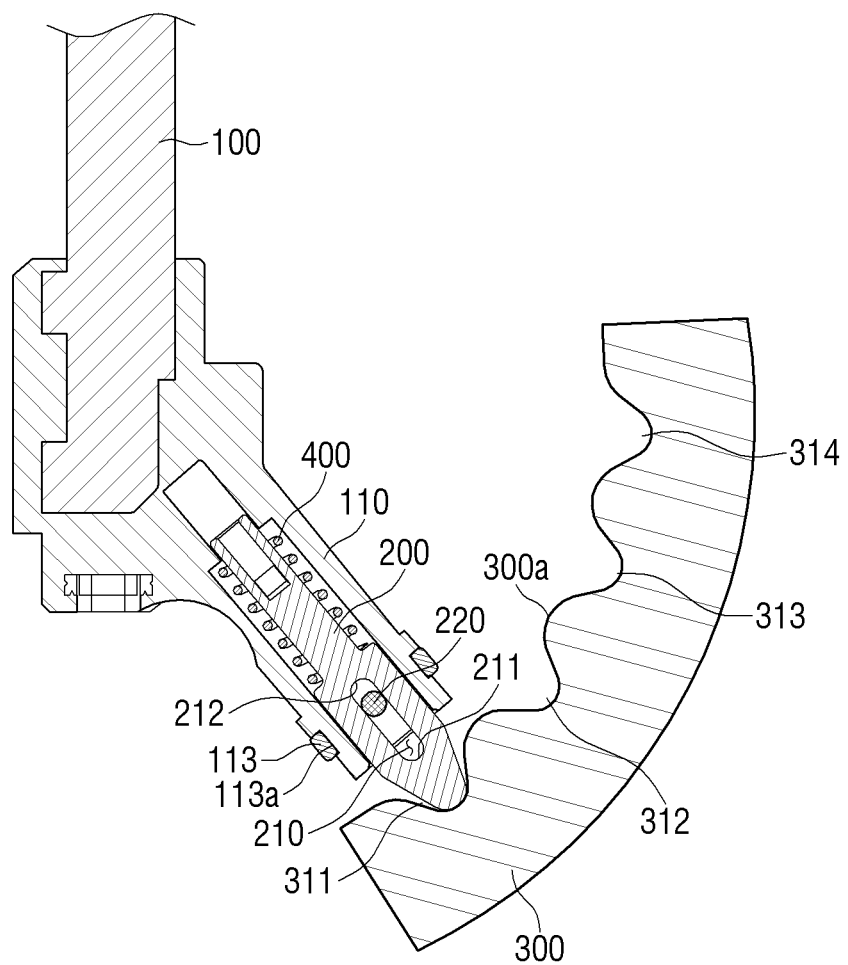
FIGS. 4 to 6 are cross-sectional views showing a position of a bullet when a shifting lever is rotated, according to an exemplary embodiment of the present disclosure.
Figure 5:
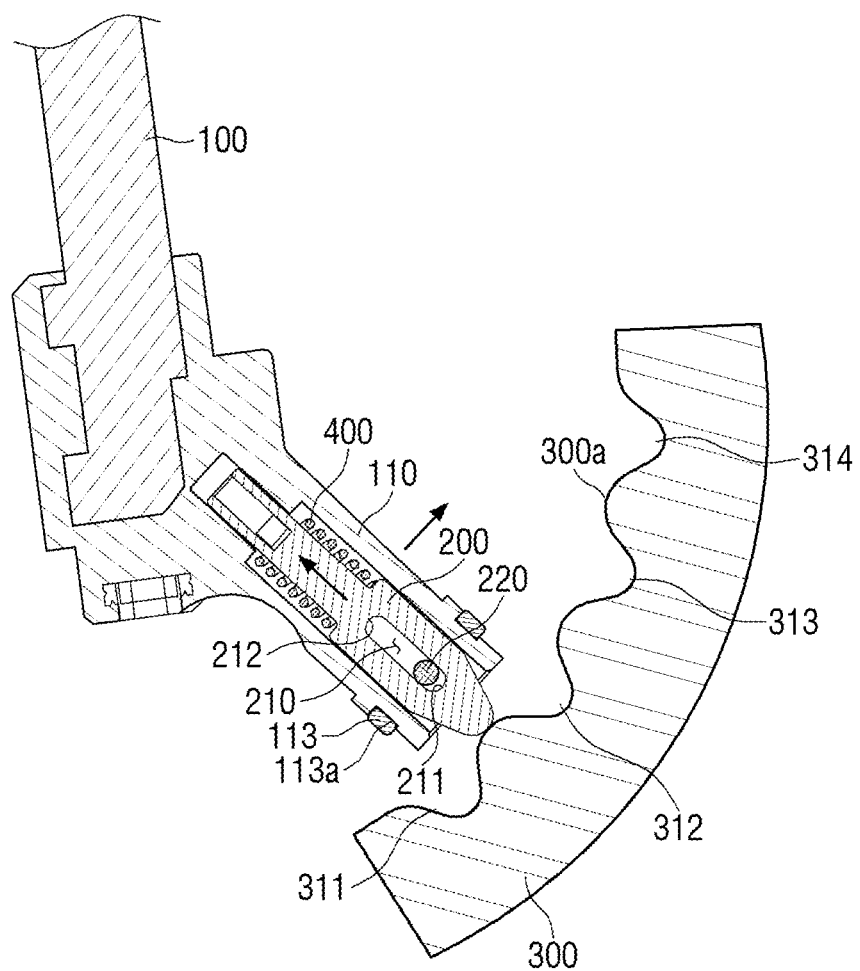
Figure 6:
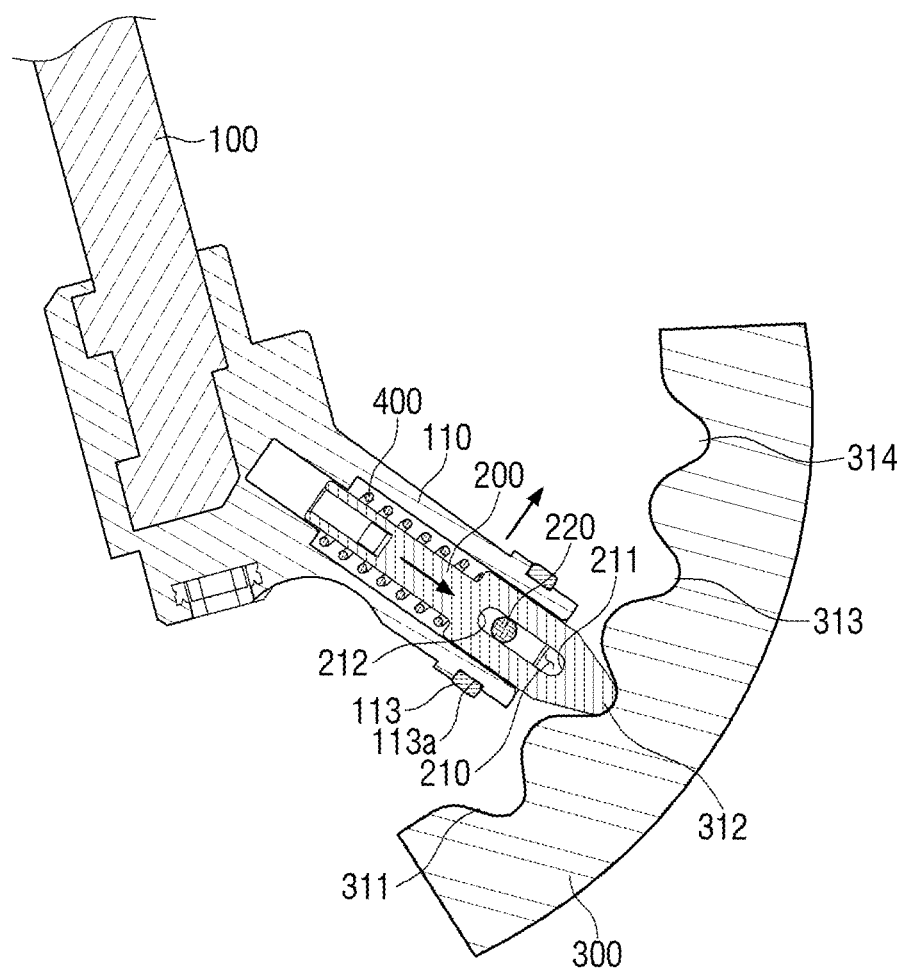

For example, when the shift lever 100 is rotated while the bullet 200 is disposed in one (311) of the plurality of detent grooves 311, 312, 313, and 314 as shown in FIG. 4, the bullet 200 may be retreated to allow the fixing pin 220 to move away from a first end 212 of the guide aperture 210 and toward a second end 211 as shown in FIG. 5 and compress the elastic member 400. When the bullet 200 is disposed in an adjacent detent groove (312), the bullet 200 may be advanced by the restoring force of the elastic member 400 to allow the fixing pin 220 to move toward the first end 212 of the guide aperture 210 and farther from the second end 211, as shown in FIG. 6. In addition, the bullet 200 may be prevented from being rotated about the axis along the advancement-retreat direction, and thus, unnecessary noise or abrasion due to the friction between the bullet 200 and the contact surface 300a of the detent groove unit 300 may be reduced or prevented from occurring.

FIGS. 4 to 6 are examples of the case where the bullet 200 moves from the detent groove 311 corresponding to a D stage the detent groove 312 corresponding to an N stage. The description may be similarly applied to cases where the bullet 200 is moved and positioned between other shift stages.

In the exemplary embodiment of the present disclosure, the movement range of the bullet 200 may be limited and the rotation of the bullet 200 may be prevented by the guide aperture 210 formed in the bullet 200 and the fixing pin 220. However, the present disclosure is not limited thereto, and in addition to the guide aperture 210 and the fixing pin 220, a structure for preventing the rotation of the bullet 200 may be additionally formed.

Figure 7:
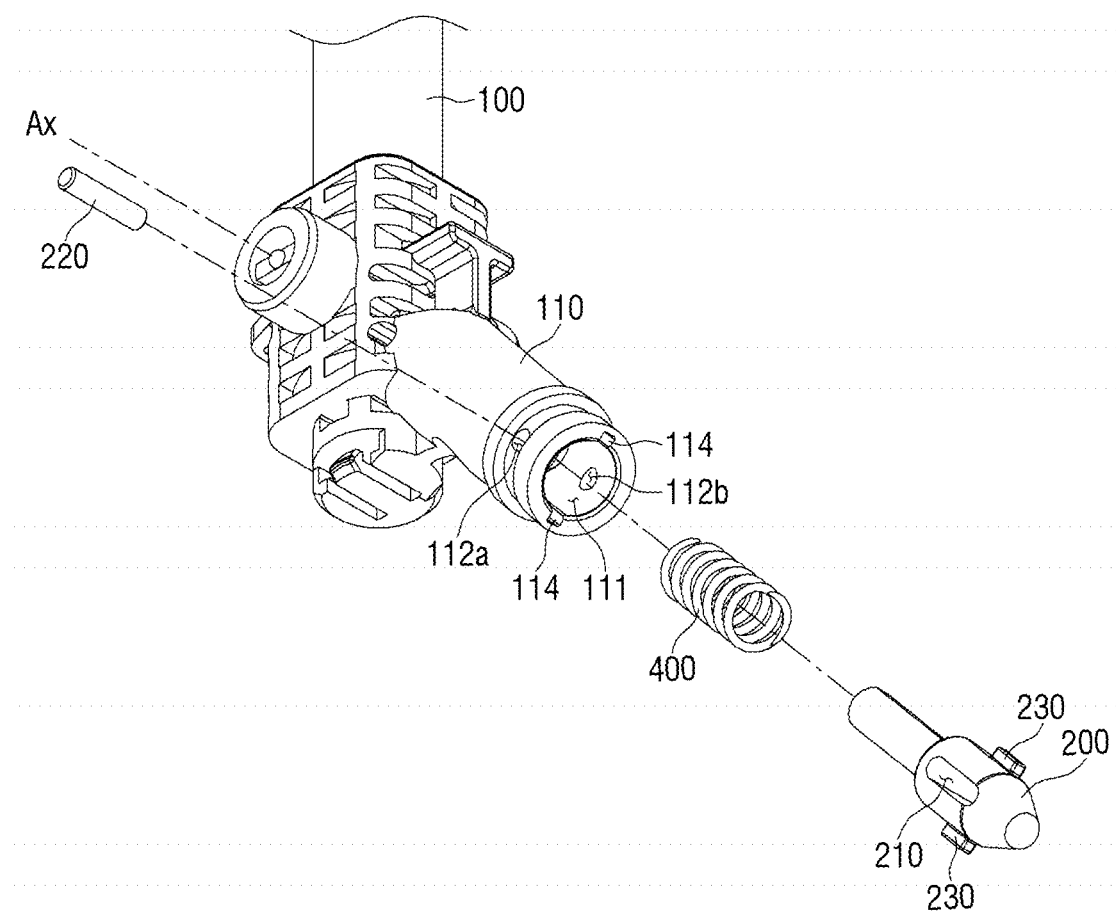
FIG. 7 is an exploded perspective view showing a shift lever according to another exemplary embodiment of the present disclosure.
Figure 8:
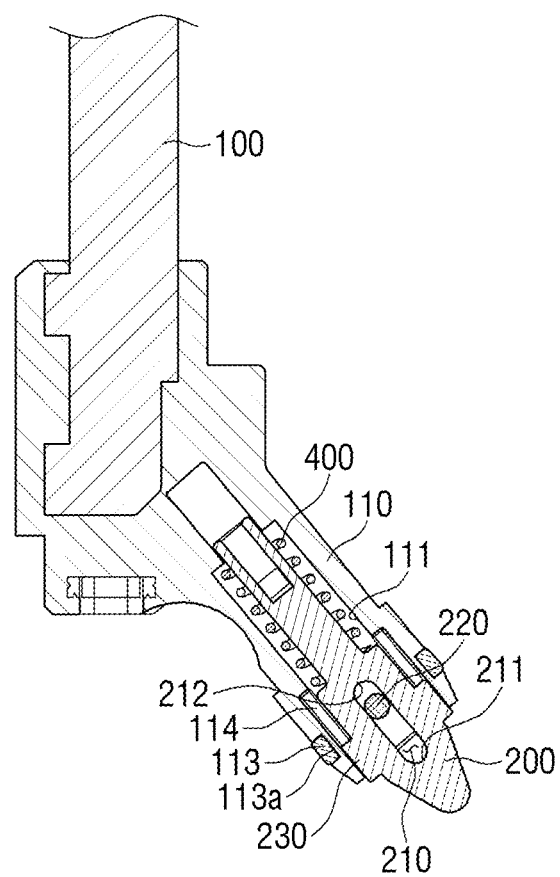
FIG. 8 is a cross-sectional view showing a shift lever according to another exemplary embodiment of the present disclosure.

FIG. 7 is an exploded perspective view showing a shift lever according to another exemplary embodiment of the present disclosure, and FIG. 8 is a cross-sectional view showing a shift lever according to another exemplary embodiment of the present disclosure.

Referring to FIGS. 7 and 8, in a shift lever 100 according to another exemplary embodiment of the present disclosure, in addition to the guide aperture 210 and the fixing pin 220, which restrict the range of movement of the bullet 200 in the advancement or retreat direction and prevent the rotation of the bullet 200 about the axis along the advancement-retreat direction, at least one protruding rib 230 may be formed on the outer surface of the bullet 200 to prevent the bullet 200 from rotating about the axis along the advancement-retreat direction. At least one rib groove 114 into which the at least one protruding rib 230 is inserted may be formed on an inner side surface of the receiving groove 111. Accordingly, the movement of the bullet 200 may be guided in advancing and retreating, and the bullet 200 may be prevented from rotating using the advancement-retreat direction as the axis of rotation.

In particular, a first end of the at least one rib groove 114 may be formed to communicate with the opening of the receiving groove 111 to allow at least a portion of the bullet 200 may be inserted into the receiving groove 111. A second end of the at least one rib groove 114 may be formed to extend in the advancement-retreat direction of the bullet 200 to enable the movement of the bullet 200 in advancing and retreating and, simultaneously, to prevent the bullet 200 from rotating about the axis along the advancement-retreat direction.

In addition, the protruding rib 230 may be disposed to be spaced apart from the inner surface of the rib groove 114 at a predetermined interval to prevent the occurrence of noise or abrasion due to the friction between the protruding rib 230 and the rib groove 114 when the protruding rib 230 is inserted into the rib groove 114. In FIGS. 7 and 8, a configuration having two protruding ribs 230 and two rib grooves 114 has been described. However, the present disclosure is not limited thereto, and the number of protruding ribs 230 and the number of rib grooves 114 may be variously changed as necessary.

In the exemplary embodiments as described above, the guide aperture 210 and the fixing pin 220 may limit the movement range of the bullet 200 in the advancement or retreat direction and prevent the bullet 200 from rotating about the advancement-retreat direction. Further, the protruding rib 230 and the rib groove 114 along with the guide aperture 210 and the fixing pin 220 may limit the movement range of the bullet 200 in the advancement or retreat direction and prevent the bullet 200 from rotating about the advancement-retreat direction. However, the present disclosure is not limited thereto. The guide aperture 210 and the fixing pin 220 may be omitted, and the protruding rib 230 and the rib groove 114 may limit the range of movement of the bullet 200 in the advancement or retreat direction and prevent the bullet 200 from rotating about the advancement-retreat direction.

Figure 9:
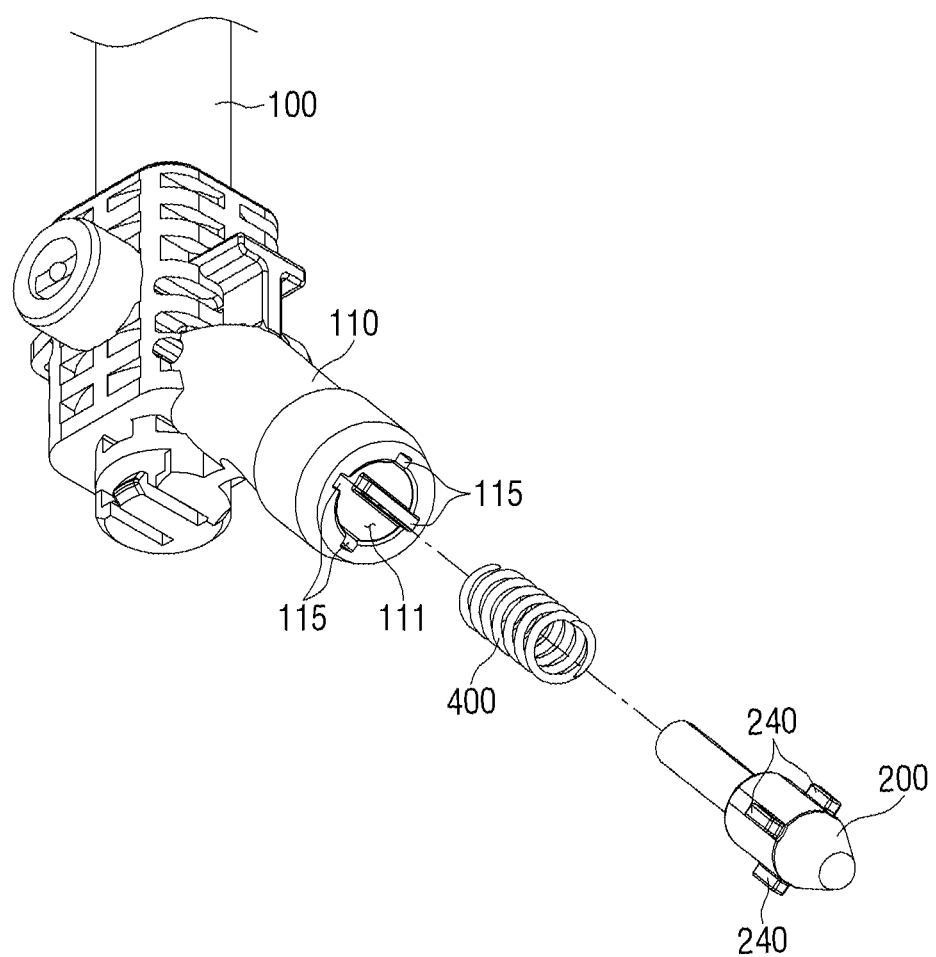
FIG. 9 is an exploded perspective view showing a shift lever according to a further exemplary embodiment of the present disclosure.

FIG. 9 is an exploded perspective view showing a shift lever according to a further exemplary embodiment of the present disclosure. Referring to FIG. 9, in a shift lever 100 according to the further exemplary embodiment of the present disclosure, at least one protruding rib 240 may be formed on the outer surface of the bullet 200, and at least one rib groove 115 may be formed on the inner side surface of the receiving groove 111, to guide the movement when the bullet 200 advances or retreats and to prevent the bullet 200 from rotating using the advancement-retreat direction as the axis of rotation.

In the further exemplary embodiment of the present disclosure, a configuration in which four protruding ribs 240 are formed on the outer surface of the bullet 200, and four rib grooves 115 are formed on the inner surface of the receiving groove 111 has been described. However, the present disclosure is not limited thereto. The number of protruding ribs 240 formed in the bullet 200 may vary, and accordingly, the number of rib grooves 115 may also vary.

As described above, the vehicle transmission 1 of the present disclosure may prevent the bullet 200 from being separated from the shift lever 100 before assembling the shift lever 100. Therefore, during the assembly or disassembly of the shift lever 100, the deterioration of productivity or a possibility of losing parts due to the detachment of the bullet 200 may be prevented.

In addition, the range of movement of the bullet 200 in the advancement or retreat direction is limited, and the bullet 200 is prevented from rotating about the axis along the advancement-retreat direction. Therefore, unnecessary noise or abrasion may be reduced or prevented.

In concluding the detailed description, those skilled in the art will appreciate that many variations and modifications can be made to the exemplary embodiments without substantially departing from the principles of the present disclosure. Therefore, the disclosed exemplary embodiments of the present disclosure are used in a generic and descriptive sense only and not for purposes of limitation.

What is claimed is:

1. A vehicle transmission, comprising:
a shift lever including a receiving unit formed therein;
a bullet, wherein at least a portion thereof is inserted and disposed within the receiving unit of the shift lever; and
a detent groove unit which allows the bullet to advance or retreat depending on a profile of a contact surface that is in contact with the bullet as the shift lever rotates,
wherein the bullet includes a guide aperture formed longitudinally along an advancement-retreat direction of the bullet, and wherein a fixing pin having at least one end thereof fixed to the receiving unit is inserted into the guide aperture.

2. The vehicle transmission of claim 1, wherein, as the bullet advances and retreats, the fixing pin approaches one of a first end or a second end of the guide aperture depending on the profile of the contact surface.

3. The vehicle transmission of claim 1, wherein the fixing pin limits a movement range of the bullet to prevent the bullet from moving out of the movement range that corresponds to a length of the guide aperture.

4. The vehicle transmission of claim 1, wherein the receiving unit comprises a fixing groove into which the at least one end of the fixing pin is inserted, and wherein the fixing groove is formed to communicate with a receiving groove formed in the receiving unit into which the at least a portion of the bullet is inserted.

5. The vehicle transmission of claim 4, further comprising:

a shield disposed on an outer surface of the receiving unit to shield the fixing groove.

6. The vehicle transmission of claim 5, wherein the shield has a ring shape that encompasses a circumference of the outer surface of the receiving unit.

7. The vehicle transmission of claim 5, wherein the receiving unit includes a mounting groove on the outer surface thereof for disposing the shield.

8. The vehicle transmission of claim 4, wherein the bullet is spaced apart from an inner surface of the receiving groove by a predetermined interval.

9. The vehicle transmission of claim 4, further comprising:

a protruding rib formed on an outer surface of the bullet; and a rib groove formed on an inner surface of the receiving groove to allow the protruding rib to be inserted into and move in the advancement-retreat direction.

10. The vehicle transmission of claim 9, wherein the protruding rib is spaced apart from an inner surface of the rib groove by a predetermined interval.

11. The vehicle transmission of claim 9, wherein the protruding rib prevents the bullet from rotating about an axis that aligns with the advancement-retreat direction.

12. The vehicle transmission of claim 9, wherein an end of the rib groove communicates with an opening of the receiving groove.

* * * * *